(12) United States Patent
Cupal et al.

(10) Patent No.: US 7,742,068 B2
(45) Date of Patent: Jun. 22, 2010

(54) METHOD AND SYSTEM FOR AUTO CONFIGURATION IN A VIDEO PHONE SYSTEM

(75) Inventors: Matthew D. Cupal, Providence, UT (US); Glenn Daniel Clapp, Sandy, UT (US); Pat Nola, Salt Lake City, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 1287 days.

(21) Appl. No.: 11/225,955

(22) Filed: Sep. 14, 2005

(65) Prior Publication Data

US 2007/0064097 A1    Mar. 22, 2007

(51) Int. Cl.
  *H04N 7/14*     (2006.01)
  *H04M 11/00*    (2006.01)
(52) U.S. Cl. .............. 348/14.01; 348/14.16; 348/14.04; 348/14.08
(58) Field of Classification Search ... 348/14.01–14.16; 709/203, 204, 205; 379/52
See application file for complete search history.

(56) References Cited

U.S. PATENT DOCUMENTS

| | | | |
|---|---|---|---|
| 4,878,843 A | 11/1989 | Kuch | |
| 5,559,855 A | 9/1996 | Dowens et al. | |
| 5,890,120 A | 3/1999 | Haskell et al. | |
| 5,936,679 A | 8/1999 | Kasahara et al. | |
| 5,982,853 A | 11/1999 | Liebermann | |
| 5,990,878 A | 11/1999 | Ikeda et al. | |
| D421,225 S | 2/2000 | Kelley | |
| 6,116,907 A | 9/2000 | Baker et al. | |
| 6,204,974 B1 | 3/2001 | Spitzer | |
| 6,317,716 B1 | 11/2001 | Braida et al. | |
| 6,349,001 B1 | 2/2002 | Spitzer | |
| 6,353,503 B1 | 3/2002 | Spitzer et al. | |
| 6,356,392 B1 | 3/2002 | Spitzer | |
| 6,384,982 B1 | 5/2002 | Spitzer | |

(Continued)

FOREIGN PATENT DOCUMENTS

EP    1 764 989 A1    3/2007

(Continued)

OTHER PUBLICATIONS

Effective set-up for performing phone conversations by the hearing impaired, IBM Technical Disclosure Bulletin, IBM Corp. New York, US, Dec. 1, 1991, pp. 423-426, vol. 34, No. 7B.

(Continued)

*Primary Examiner*—Melur Ramakrishnaiah
(74) *Attorney, Agent, or Firm*—TraskBritt

(57) ABSTRACT

A method and system for automatic camera configuration, upon establishment of a communication session is described. A number is entered into a video phone and a first segment of a communication session is established between the video phone and a service system. The service system retrieves and stores a current default pan, tilt, zoom (PTZ) setting from the video phone camera. The service system transmits the video phone's corresponding camera PTZ preset settings and the video phone configures the camera according to the preset. Upon termination of the communication session, a video relay service (VRS) transmits the default PTZ setting to the video phone and the video phone reconfigures the camera according to the original camera setting.

20 Claims, 5 Drawing Sheets

U.S. PATENT DOCUMENTS

| | | |
|---|---|---|
| 6,498,628 B2 | 12/2002 | Iwamura |
| 6,553,116 B1 | 4/2003 | Vander Meiden |
| 6,611,281 B2 | 8/2003 | Strubbe |
| 6,618,099 B1 | 9/2003 | Spitzer |
| 6,693,630 B1 | 2/2004 | Siskind |
| 6,724,354 B1 | 4/2004 | Spitzer et al. |
| 6,775,014 B2 | 8/2004 | Foote et al. |
| 7,016,479 B2 | 3/2006 | Flathers et al. |
| 2002/0177112 A1 | 11/2002 | Heller |
| 2005/0073574 A1 | 4/2005 | Krisbergh et al. |
| 2005/0091311 A1* | 4/2005 | Lund et al. .................. 709/203 |
| 2005/0094777 A1 | 5/2005 | McClelland |
| 2006/0285652 A1 | 12/2006 | McClelland et al. |

FOREIGN PATENT DOCUMENTS

| | | |
|---|---|---|
| EP | 1 764 990 A2 | 3/2007 |
| EP | 1 770 481 A2 | 4/2007 |
| JP | 2004343175 A * | 12/2004 |
| WO | 03/019495 A2 | 3/2003 |
| WO | 2005/039165 A2 | 4/2005 |

OTHER PUBLICATIONS

European Search Report, EP 06 07 6734, dated Dec. 11, 2006, 7 pages.

European Search Report for EP 06 07 6735 dated Mar. 14, 2007.

European Search Report, EP 06 07 6736, dated Jan. 4, 2007, 5 pages.

* cited by examiner

METHOD AND SYSTEM FOR AUTO CONFIGURATION IN A VIDEO PHONE SYSTEM

BACKGROUND OF THE INVENTION

1. Field of the Invention

The invention relates generally to increased efficiency in a video phone communication system, and more specifically, to a method and system for automatically configuring a video phone during a communication session.

2. State of the Art

Video phone communication systems provide visual and audio communication between two or more users during a communication session. A video phone camera at a first location can transmit and receive audio and video signals to and from a video phone camera at a second location such that participants at the first location are perceived to be present or face-to-face with participants at a second location and vice versa. Video phones typically include a camera, display device, telephone keypad, speaker and a microphone all of which are operatively connected. Several video phones on the market are equipped with "Pan Tilt Zoom" (PTZ) cameras, which allow the camera to pan the room and locate a particular location. Typically, users can adjust the pan, tilt, and zoom functions from either the near side or remote side.

Video phone communication systems span a variety of applications. One possible application of a video phone system includes facilitization of a communication session with a deaf or hearing-impaired user. A hearing-impaired user can use a video phone during a communication session to relay his or her expressions. The expressions, such as sign language and/or body language, may be interpreted or translated by a translation service such as a video relay service (VRS). The translation service provides a hearing-capable user who relays the expressions of the hearing-impaired caller to a user on the other end of the communication session in a conventional manner, such as through the use of a voice-based dialogue conveyed over a conventional voice phone.

Traditionally, at the beginning of a video phone communication session, users are required to align the camera in order to locate and focus on a particular location. Even though a hearing-impaired user may sit in the same location from one call to the next, an interpreter on the other end may spend time at the beginning of a call attempting to adjust the camera in order to obtain an improved view of the hearing-impaired user. Because live interpreters are very expensive, valuable time can be wasted at the beginning of a call while framing the user in the picture.

Therefore, in order to provide increased efficiency for users of a video phone communication system where a calling party needs the assistance of an intermediary service, a need exists for improving efficiencies during the setup time of each call.

SUMMARY OF THE INVENTION

The present invention is directed to a method and system for automatic configuration of a camera in a video phone communication system. In one embodiment of the present invention, a method for establishing a communication session is provided. The method includes entering into a video phone a called party number of a voice number. A first segment of the communication session is established between the video phone and a video relay service (VRS) according to a network address of the VRS system stored within the video phone. The VRS retrieves and transmits the corresponding camera pan, tilt, zoom (PTZ) preset values to the video phone, and the video phone then configures itself according to the camera PTZ preset values.

In another embodiment of the present invention, a video phone communication system is provided. The communication system includes at least one video phone reconfigurable according to pan, tilt, zoom (PTZ) settings and a video relay service (VRS) system configured to store settings corresponding to a video phone PTZ preset. The VRS is further configured to transmit the PTZ preset designating a specific setting of the video phone. The communication system further includes at least one communication link for transceiving between the at least one video phone and the video relay service during a communication session.

In a further embodiment of the present invention, a video phone is provided. The video phone includes an interface configured to transmit an outgoing call to a video relay service (VRS) and an input device configured to receive a pan, tilt, zoom (PTZ) preset from the VRS corresponding to a video phone. The video phone further includes a control process for configuring a camera of the video phone according to the PTZ preset.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
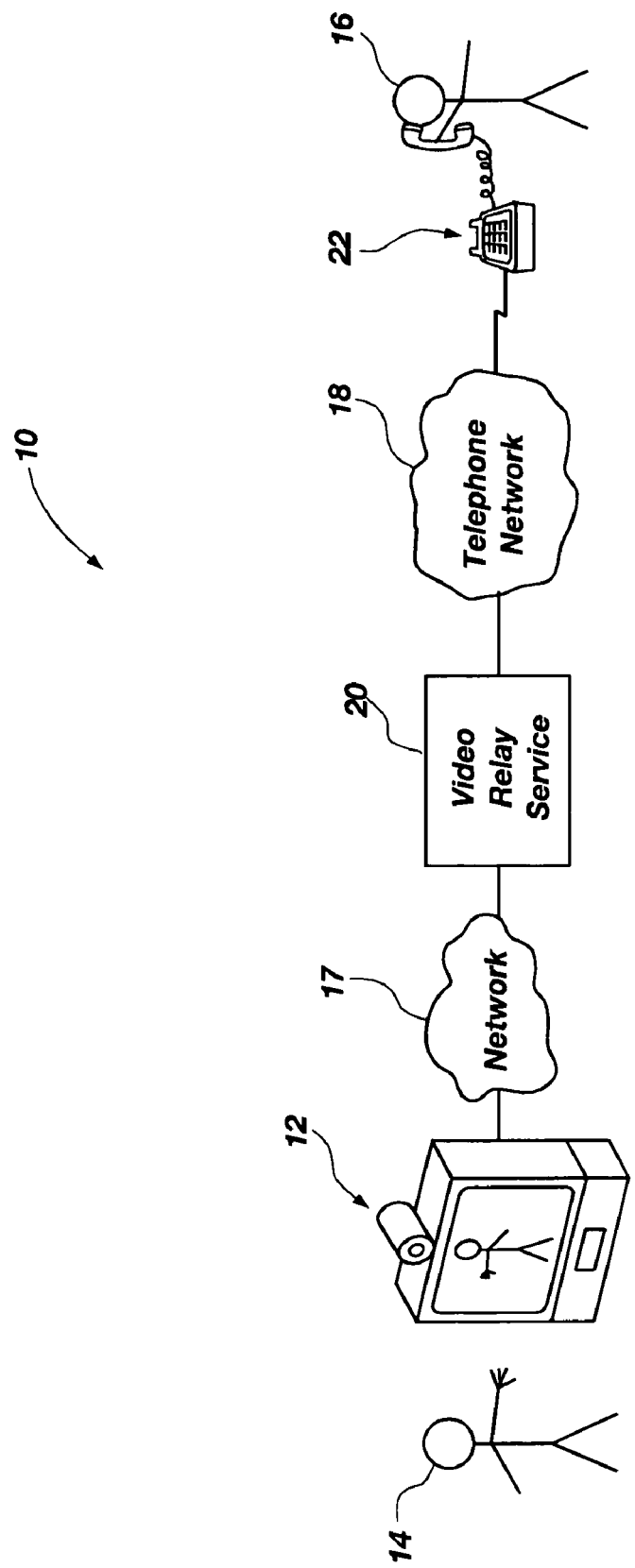
FIG. 1 illustrates a hearing-impaired communication system, in accordance with an embodiment of the present invention.

Video phone communication systems provide visual and audio communication between two or more users. One possible application of a video phone system is a communication session in which one participant is deaf or hearing-impaired. A means for relaying the communicative expressions of a hearing-impaired user within a hearing-impaired communication system incorporates a video phone for capturing and displaying the communicative expressions exhibited by a hearing-impaired user and for displaying interpreted voice information originating from a hearing-capable user. The expressions, such as sign language and/or body language, may be interpreted or translated by a translation or interpretive service such as a video relay service (VRS) while a hearing-capable user interacts in a conventional manner with the VRS through the use of a voice-based dialogue conveyed over either a conventional voice phone or another video phone device.

Currently, a desire exists to improve the ease and efficiency of the initial configuration of a camera in an interpretive communication session. Often, a single video phone may be used by more than one user, or possibly even used for multiple applications by more than one user. Consequently, the camera is not always optimally oriented for observation of the hearing-impaired user by the interpreter at the VRS. An interpreter must therefore spend valuable time configuring the camera in order to view the hearing-impaired user. Thus, a need exists for improved efficiency in the setup time of a communication session. Additionally, it is essential in a communication session that the interpreter has a full and focused view of the hearing-impaired user. Because the available view or image of the hearing-impaired user is not always ideal, a need exists to improve the accuracy and ease of the translation and observation of the expressions of the hearing-impaired user.

In one embodiment of the present invention, a hearing-impaired user initiates a communication session by entering, in the video phone, a phone number of a voice phone that the user wishes to speak with, and the call request is forwarded to the VRS. If the hearing-impaired caller is a first time user, no camera PTZ preset for that user is stored in the VRS server, thus requiring the interpreter to manually set the camera pan, tilt, zoom (PZT) values from the remote location. The camera pan, tilt, zoom (PTZ) preset will hereafter be referred to as "PTZ preset." The VRS back end server then stores the camera PTZ preset for that particular hearing-impaired user and upon a repeat call from the hearing-impaired user, the preset is available, and the video relay service retrieves and transmits the PTZ preset to the hearing-impaired user's video phone for reorientation of the camera according to the specifics of the PTZ preset. Users of the video relay service would therefore have a user profile that includes, among other things, their camera PTZ preset configuration values and, upon receiving the PTZ preset, the video phone configures the camera accordingly. Furthermore, upon termination of a communication session, the VRS configures the camera back to the initial pan, tilt, zoom setting that existed before call initiation. The initial PTZ setting will hereafter be referred to as a "default PTZ setting."

Since it is likely that the hearing-impaired user sits in the same location from one call to the next, the interpreter does not need to spend valuable time at the beginning of each subsequent call manually setting the camera for optimal use. Thus, the setup time for each call is reduced and the performance of the system is improved. In the event a video phone user has more than one area where he or she stands or sits, a VRS could have the capability to store more than one PTZ preset value for each user. If the interpreter is unable to locate the hearing-impaired user after the camera has been configured according to the PTZ preset, the interpreter could then check the next PTZ preset location in an attempt to efficiently locate the user.

FIG. 1 illustrates a hearing-impaired communication system configured to facilitate a communication session between a hearing-impaired user and a hearing-capable user, in accordance with an embodiment of the present invention. A hearing-impaired communication system 10 enables a hearing-impaired user 14 to engage in conversation through a communication system with a hearing-capable user 16. A communication session between the users is facilitated through the use of various equipments, which are preferably coupled together using various networks, including a telephone network, such as a wide area network and/or the Public Switch Telephone Network (PSTN).

To interface a hearing-impaired user into a generally voice-based communication system, interpretive services are employed allowing hearing-impaired users to communicate with an interpreter, namely through sign language. The sign language images are then translated by a VRS 20 and when translated into voice information, are then forwarded over a voice-based communication connection to a hearing-capable user 16. One means for relaying the communicative expressions of a hearing-impaired user 14 within hearing-impaired communication system 10 incorporates a video phone 12 for capturing and displaying the communicative expressions exhibited by hearing-impaired user 14 and for displaying interpreted voice information originating from the hearing-capable user 16. The expressions, such as sign language and/or body language, may be interpreted or translated by VRS 20. Hearing-capable user 16 interacts in a conventional manner with VRS 20 through the use of a voice-based dialogue conveyed over a conventional voice phone 22.

The various devices, such as video phone 12 and conventional voice phone 22, are coupled with VRS 20 using one or more networks 17, 18. To facilitate the enhanced bandwidth needs of video phone 12, network 17 may be implemented as a high bandwidth network such as a DSL, Cable, Ethernet or other enhanced-bandwidth networking technology. Network 18 may be implemented according to the standards and bandwidth requirements of conventional voice phone 22.

Figure 2:
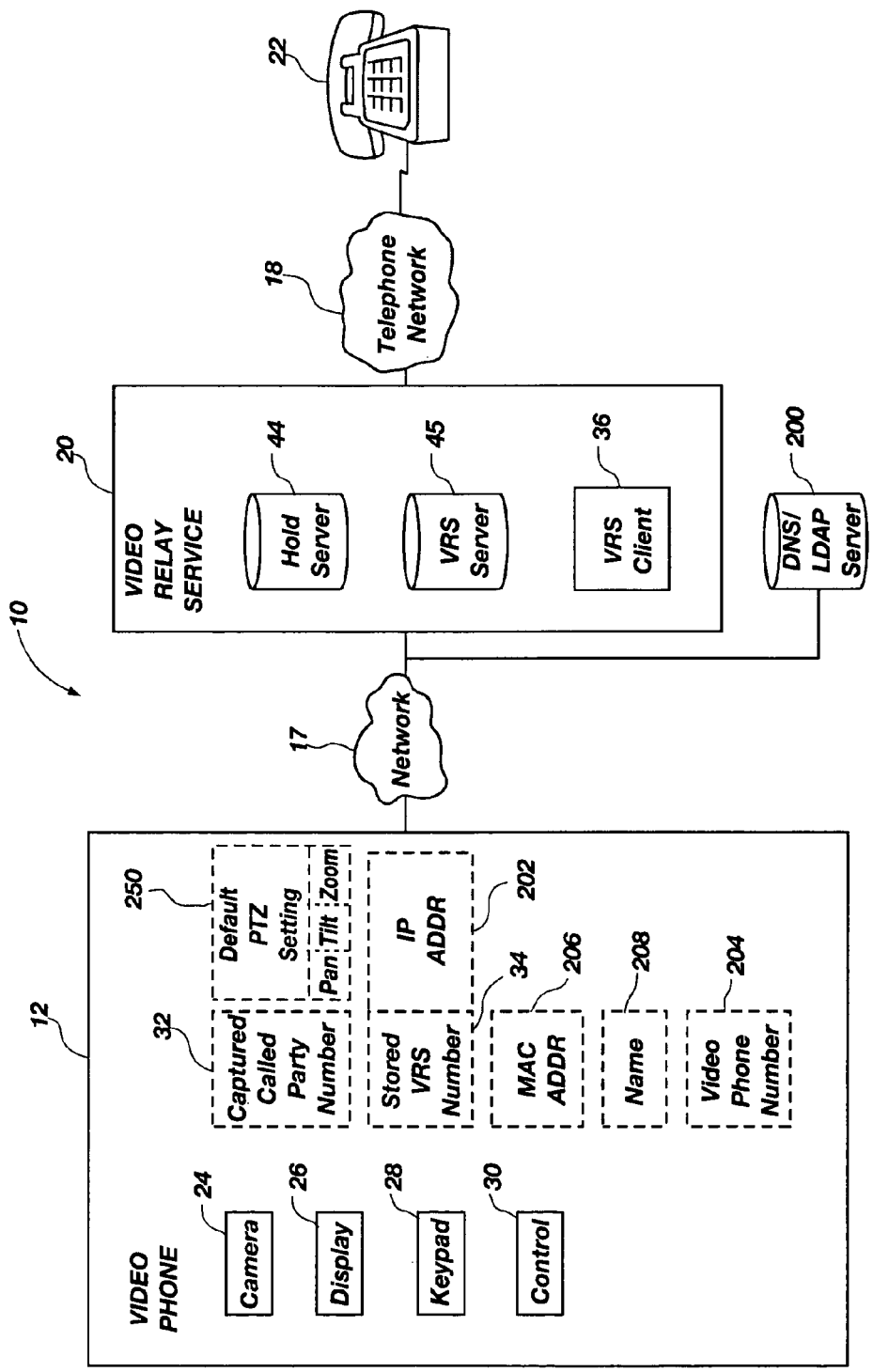
FIG. 2 illustrates a simplified block diagram of a hearing-impaired communication system, in accordance with an embodiment of the present invention.

FIG. 2 is a simplified diagram of a hearing-impaired communication system 10, in accordance with an embodiment of the present invention. To facilitate the interaction with a hearing-impaired user, a video phone 12 includes video components such as a camera 24 for capturing the communicative expression of a hearing-impaired user and further includes a display or monitor 26 for displaying the communicative expressions originating from the hearing-capable user as interpreted by the VRS 20.

In one embodiment of the present invention, upon initiation of a communication session by a hearing-impaired user, a VRS 20 retrieves the default PTZ setting 250 from the video phone 12 and stores a copy 250' (FIG. 3) of the default PTZ setting values for the camera 24 in its initial state. The VRS 20 retrieves and stores the default PTZ setting 250 in order, upon call termination, to reconfigure the camera 24 back to the position it was in prior to call initiation. During the communication session, the VRS 20 then pans, tilts, and zooms the camera 24 in order to locate and focus on the hearing-impaired user. Upon successful location of the hearing-impaired user, the VRS 20 retrieves and stores the camera PTZ preset location values. In this embodiment, a user from the same video phone can initiate a communication session in a conventional manner by entering, in the video phone 12, the party number 32 with whom he or she wishes to speak. The video phone 12 then connects to the VRS 20 and while the call is on hold, the VRS 20 attempts to acquire an interpreter, and retrieves and stores the default PTZ setting 250. The VRS 20 thereafter sends the PTZ preset to the video phone 12, which then configures the camera 24 for the interpretive session. In one embodiment, upon termination of the call, the VRS 20 transmits the copy 250' (FIG. 3) of the default PTZ setting 250 back to the video phone 12 and the camera 24 is then reconfigured to the previous state.

Video phone 12, in accordance with an embodiment of the present invention, further includes a keypad 28 or other data entry device configured to enable a hearing-impaired user to initiate a communication session in a conventional manner by entering the telephone number of the hearing-capable user, also known herein as a called party telephone number, which is captured and stored as captured called party number 32. In accordance with one embodiment of the present invention, the hearing-impaired user is able to interact with video phone 12 to initiate a phone call in a manner consistent with the interaction of a hearing-capable user initiating a phone call using a conventional telephone. Specifically, a hearing-impaired user enters, using an input device such as keypad 28, the called party number that is captured by a control process 30 and stored as a captured called party number 32.

Control process 30 retrieves a stored VRS number 34, which identifies a specific VRS, and using a protocol, such as DNS or LDAP protocol, contacts a DNS or an LDAP server 200 and passes thereto a domain name or stored VRS number 34 and requests therefrom a corresponding IP address 202, which is returned to video phone 12. Video phone 12 thereafter initiates a call to VRS 20 over network 17 using, for example, corresponding IP address 202 as returned from DNS or LDAP server 200. Control process 30 initiates a communication session over network 17 between video phone 12 and VRS 20.

In one embodiment of the present invention, the communication session between video phone 12 and VRS 20 is more specifically initially connected to a hold server 44 within VRS 20. Hold server 44 communicates with a VRS server 45 and when hold server 44 receives an inbound call in the form of a call request for the establishment of a communication session between video phone 12 and VRS 20, hold server 44 notifies VRS server 45 of the intention to establish a communication session between video phone 12 and conventional voice phone 22. During the establishment of the communication session between video phone 12 and VRS 20, video phone 12 passes a call request including calling information to hold server 44. The call request is subsequently passed to VRS server 45 including the calling information, which includes a video phone number 204, a MAC address 206, a name 208 and captured called party number 32. The VRS 20 retrieves the default PTZ setting 250 from the camera 24 before configuring the camera 24 according to the PTZ preset. In one embodiment, at the end of the communication session, the copy 250' (FIG. 3) of the default PTZ setting 250 is retrieved from the VRS 20, transmitted to the video phone 12, and the camera 24 is configured back to the previous state.

Figure 3:
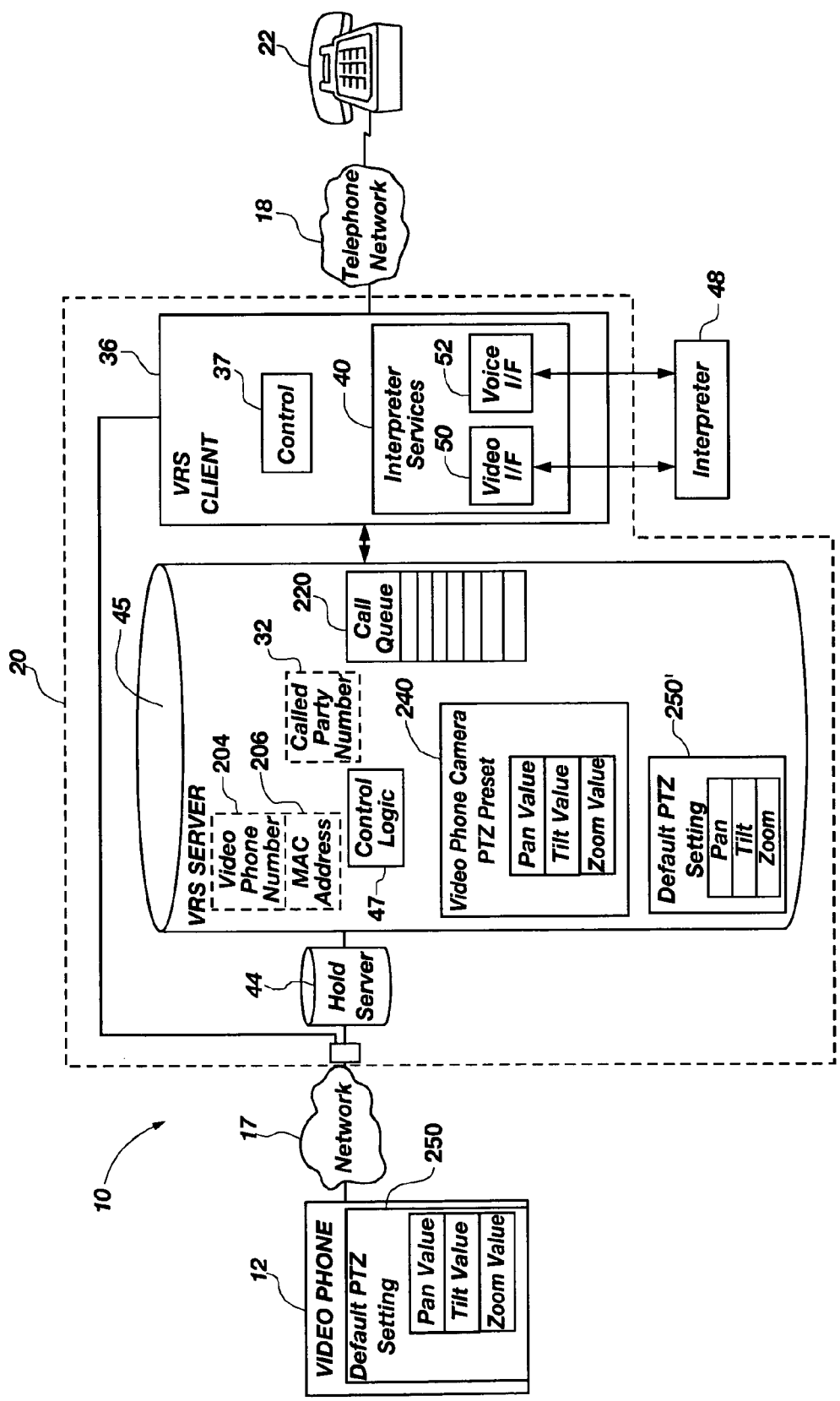
FIG. 3 illustrates a functional block diagram of a VRS configured for operation with a hearing-impaired communication system, in accordance with an embodiment of the present invention.

FIG. 3 is a functional block diagram of a hearing-impaired communication system 10 including a VRS system, configured in accordance with an embodiment of the present invention. The video phone 12 and voice phone 22 interact via VRS 20 and as further coupled via networks 17, 18. During the establishment of a connection between a video phone 12 and a VRS 20, call information including video phone number 204, MAC address 206, and captured called party number 32 are forwarded according to control logic 47 via hold server 44 to VRS server 45.

VRS 20 further provides storage for video phone camera PTZ preset 240, and a copy 250' of the default PTZ setting 250. A video phone user is likely to sit in the same place each time he or she uses the video phone. Therefore, in order to increase efficiency, the VRS 20 stores PTZ preset 240 according to the user's location as identified by camera settings. Each time a user initiates a call, the VRS 20 can quickly configure the camera to the user's location, and the communication session is ready to begin when, for example, an interpreter becomes available. The preset includes values for PTZ according to the video phone 12. When VRS server 45 receives a call request from hold server 44, VRS server 45 retrieves default PTZ setting 250 from the video phone 12 and stores a copy 250' into the VRS server 45. VRS server 45 then attempts to retrieve PTZ preset 240. If the PTZ preset 240 is not populated, then the interpreter must manually set the camera. If the camera PTZ preset box is populated, the VRS server transmits the video phone PTZ preset 240 to the video phone 12. Upon receiving PTZ preset 240, video phone 12 configures the camera accordingly.

VRS 20 further includes a VRS client 36, which provides interfaces to both the hearing-capable user at a voice phone 22 via network 18, and an interface with an interpreter 48 through interpreter services 40, which further includes video and voice interfaces 50, 52. The VRS client 36 notifies the VRS server 45 via control 37 when interpretive services are available. VRS server 45 thereafter services the next call request in the call queue 220. VRS client 36 then receives the call from the hold server 44 when the VRS server 45 determines which call request in the call queue 220 has priority and then instructs the hold server 44 to transfer the call to the VRS client 36.

Figure 4:
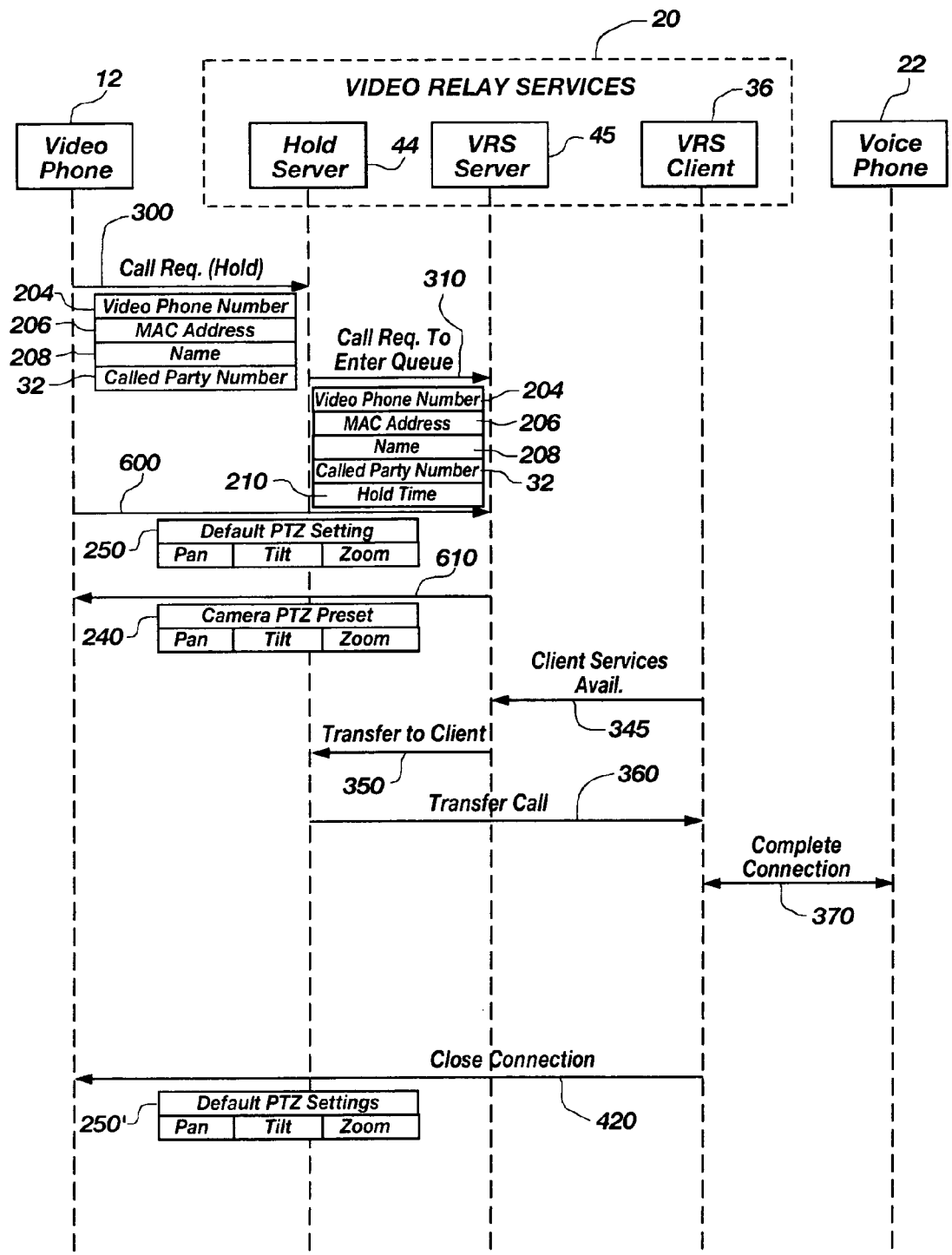
FIG. 4 is a flow diagram illustrating the establishment of a communication session, in accordance with an embodiment of the present invention.

FIG. 4 is a flow diagram illustrating the establishment of a communication session, automatic camera configuration, call transfer, completion of a connection, and closing a connection. In the present embodiment, a video phone 12 initiates a call 300 to a VRS 20 and passes thereto various call information, including video phone number 204, MAC address 206, a name 208 and captured called party number 32. A hold server 44 of VRS 20 receives the initiated call and places the call on hold and issues a service's request to enter request 310 the call into a queue within VRS server 45. Information passed during enter request 310 includes video phone number 204, MAC address 206, a name 208, called captured called party number 32 as well as a duration time on hold 210 for delay encountered by the call while waiting on hold server 44. While the call is on hold, the VRS server 45 retrieves 600 default PTZ setting 250 from video phone 12. A copy 250' (FIG. 3) of the default PTZ setting 250 is then stored in the VRS server 45 during call connection. The VRS further transmits 610 camera PTZ preset 240 to video phone 12 and upon receiving camera PTZ preset 240, video phone 12 configures camera 24 accordingly, and interpretive procedures are ready to begin.

When interpretive resources become available 345, VRS server 45 issues a transfer request 350 designating a specific VRS client ID to which the hold server 44 should route the call corresponding to the call record ID on the top of call queue 220 (FIG. 3). Hold server 44 transfers 360 the call to VRS client 36 and VRS client 36 correspondingly completes 370 the connection with voice phone 22.

In one embodiment, the camera of the video phone 12, after termination of a call, is adjusted back to the initial setting. When the user initiates a close connection 420, the VRS server 45 retrieves the copy 250' (FIG. 3) of the default PTZ setting 250, transmits the setting to the video phone 12, and the video phone 12 camera is reconfigured accordingly.

Figure 5:
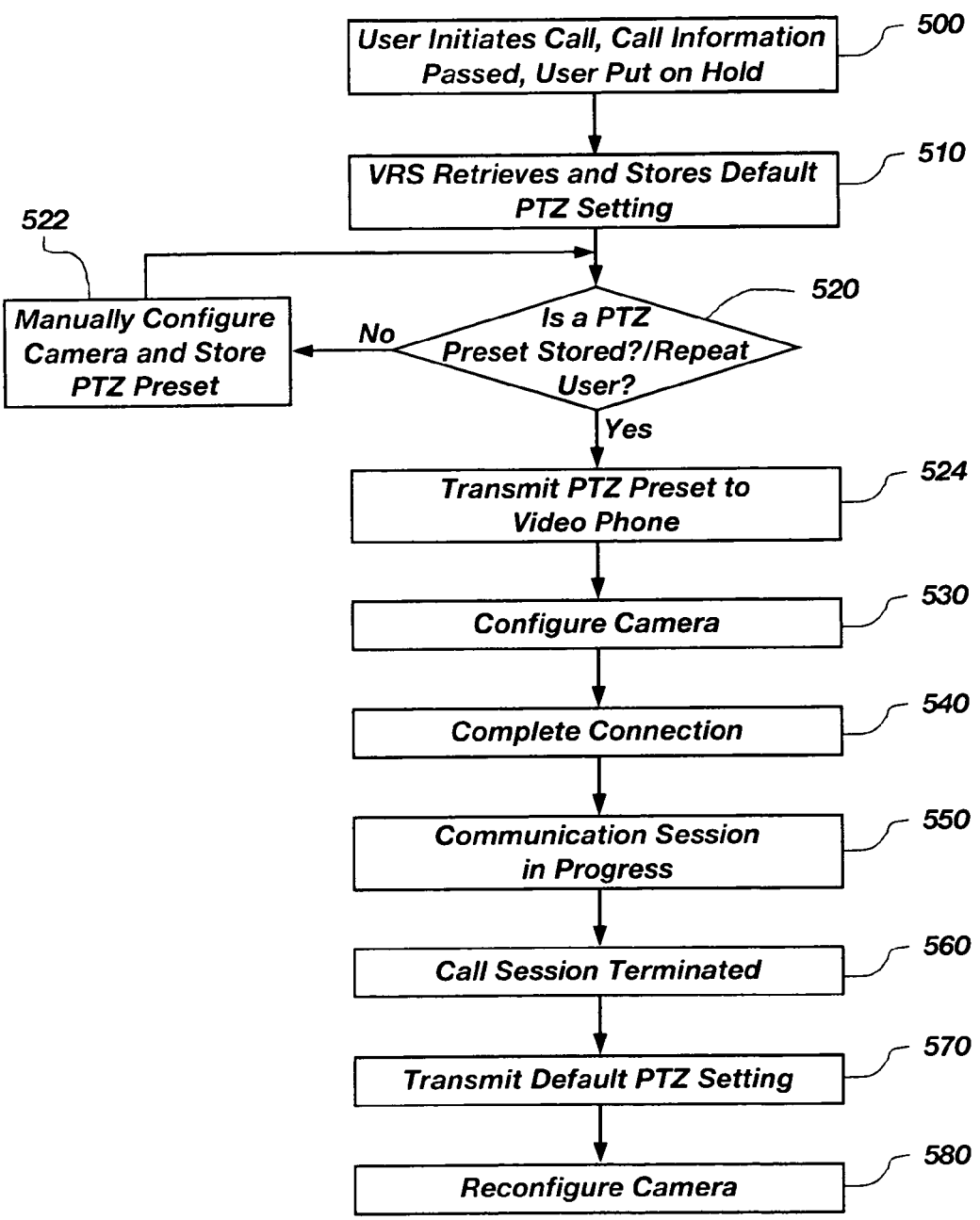
FIG. 5 is a simplified flow diagram of a communication session, in accordance with an embodiment of the present invention.

FIG. 5 is a simplified flow diagram of a communication session illustrating the initiation of a communication session, automatic camera configuration, call completion, and call termination. A user initiates 500 a call by entering, in the video phone, a called party number of a voice phone. The call request is then forwarded to the VRS hold server including the calling information, which includes a video phone number, a MAC address, a name, and the captured called party number. When a connection with the video phone is received at the hold server, the VRS retrieves 510 the default PTZ setting for the camera and a copy of the default PTZ setting is stored in the VRS during the communication session. The VRS server then attempts 520 to retrieve the PTZ preset according to the video phone that initiated the call. If the caller is a first-time user and the preset is not available, then the interpreter must manually set 522 the camera, and then the preset is stored. If the caller is a repeat user, the preset will be present in the user profile and the VRS retrieves the preset and transmits 524 the preset to the video phone. Upon receiving the PTZ preset, the video phone configures 530 the camera accordingly, and the communication session is ready to begin. There is no need for a user or an interpreter to spend time at the beginning of a call configuring the camera.

When the interpreter is ready, the VRS completes the call 540, and the communication session takes place 550. In one embodiment, upon termination 560 of the call, the stored default PTZ setting is retrieved by the VRS, transmitted 570 to the video phone, and the video phone configures 580 the camera back to its previous setting.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method for establishing a communication session, comprising:
    entering in a video phone a called party number of a voice phone;
    establishing a first segment of the communication session between the video phone and a video relay service (VRS) system using a network address of the VRS stored within the video phone;
    retrieving a video phone pan, tilt, zoom (PTZ) preset corresponding to the video phone; and
    configuring the video phone according to the PTZ preset.

2. The method of claim 1, wherein the PTZ preset contains at least one of pan, tilt, and zoom configuration values.

3. The method of claim 1, further comprising retrieving a default pan, tilt, zoom (PTZ) setting from the video phone, the default PTZ setting identifying a current setting of the video phone.

4. The method of claim 1, further comprising transmitting a default PTZ setting to the video phone prior to completion of the communication session.

5. The method of claim 3, wherein the default PTZ setting contains at least one of pan, tilt, and zoom configuration values.

6. The method of claim 1, further comprising establishing a second segment of the communication session between the VRS and the voice phone.

7. The method of claim 6, further comprising providing interpretive services at the VRS according to the video phone configured with the PTZ preset.

8. The method of claim 1, wherein retrieving the PTZ preset further comprises adjusting PTZ settings of the video phone to frame a user of the video phone and storing a current state of the PTZ settings as the PTZ preset.

9. A communication system, comprising:
    at least one video phone reconfigurable according to pan, tilt, zoom (PTZ) settings;
    a video relay service (VRS) system configured to store settings corresponding to a video phone PTZ preset, the VRS further configured to transmit the PTZ preset designating a specific setting of the video phone; and
    at least one communication link for transceiving between the at least one video phone and the video relay service during a communication session.

10. The communication system of claim 9, wherein the PTZ preset contains at least one of pan, tilt, and zoom configuration values.

11. The communication system of claim 9, wherein the VRS system is further configured to store a default pan, tilt, zoom (PTZ) setting.

12. The communication system of claim 11, wherein the default PTZ setting contains at least one of pan, tilt, and zoom configuration values.

13. The communication system of claim 9, wherein the at least one video phone is further configured to reconfigure according to a default PTZ setting prior to completion of the communication session.

14. The communication system of claim 9, wherein the VRS system is further configured to adjust the PTZ settings of the video phone to frame a user of the video phone and store a current state of the PTZ settings as the PTZ preset.

15. A video phone, comprising:
    an interface configured to receive an entered called party number of a voice phone and to transmit an outgoing call to a video relay service (VRS);
    an input device configured to receive a pan, tilt, zoom (PTZ) preset from the VRS corresponding to a video phone in response to the entered called party number; and
    a control process for configuring a camera of the video phone according to the PTZ preset.

16. The video phone of claim 15, wherein the PTZ preset contains at least one of pan, tilt, and zoom configuration values.

17. The video phone of claim 15, further comprising an output device for transmitting a default camera pan, tilt, zoom (PTZ) setting to the VRS.

18. The video phone of claim 17, wherein the default PTZ setting contains at least one of pan, tilt, and zoom configuration values.

19. The video phone of claim 15, further configured to reconfigure according to a default PTZ setting prior to completion of the communication session.

20. The video phone of claim 15, further configured to be responsive to adjustment of the PTZ settings of the video phone to frame a user of the video phone and transmit a current state of the PTZ settings as the PTZ preset.

* * * * *